June 10, 1924.

F. W. FRESE

AIR PURIFIER

Filed Oct. 30, 1922

1,497,367

Inventor
Fredrick W. Frese

By Herbert E. Smith
Attorney

Patented June 10, 1924.

1,497,367

UNITED STATES PATENT OFFICE.

FREDRICK W. FRESE, OF SPOKANE, WASHINGTON, ASSIGNOR OF ONE-FOURTH TO LEON F. OLNEY, OF SPOKANE, WASHINGTON.

AIR PURIFIER.

Application filed October 30, 1922. Serial No. 598,038.

*To all whom it may concern:*

Be it known that I, FREDRICK W. FRESE, a citizen of the United States, residing at Spokane, in Spokane County, and State of Washington, have invented certain new and useful Improvements in Air Purifiers, of which the following is a specification.

The present invention relates to improvements in air purifiers designed particularly for use in connection with carbureters for internal combustion engines of automotive vehicles, watercraft, etc. In carrying out my invention I utilize power from the engine or motor for forcing air through the device of the invention for the purpose of purification by the elimination of dust, and also provide the air, as it is supplied to the carbureter, with sufficient moisture to enhance the efficiency of the fuel charge when fed to the engine cylinder. This supply of moist, purified air, not only enhances the value of the fuel charge resulting in smooth and efficient running of the engine, but the addition of purified air to the charge tends to prevent accummulation of carbon in the engine cylinders.

The invention consists in certain novel combinations and arrangements of parts hereinafter fully described and claimed. In the accompanying drawings I have illustrated one complete example of the physical embodiment of my invention wherein the parts are combined and arranged according to the best mode I have thus far devised for the practical application of the principles of my invention.

Figure 1:
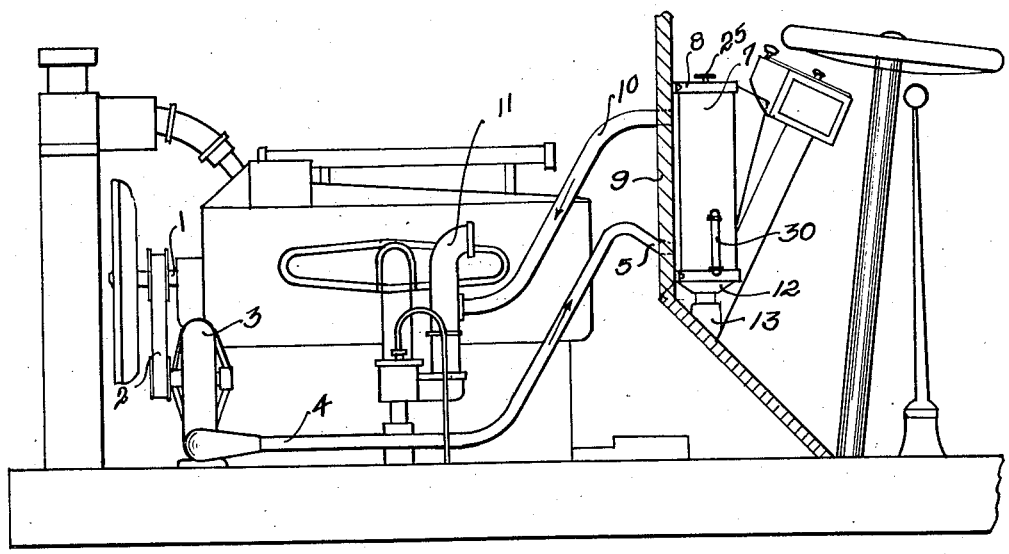
Figure 1 is a view in side elevation of so much of an automobile as is necessary to illustrate the application thereto of my invention.
Figure 2:
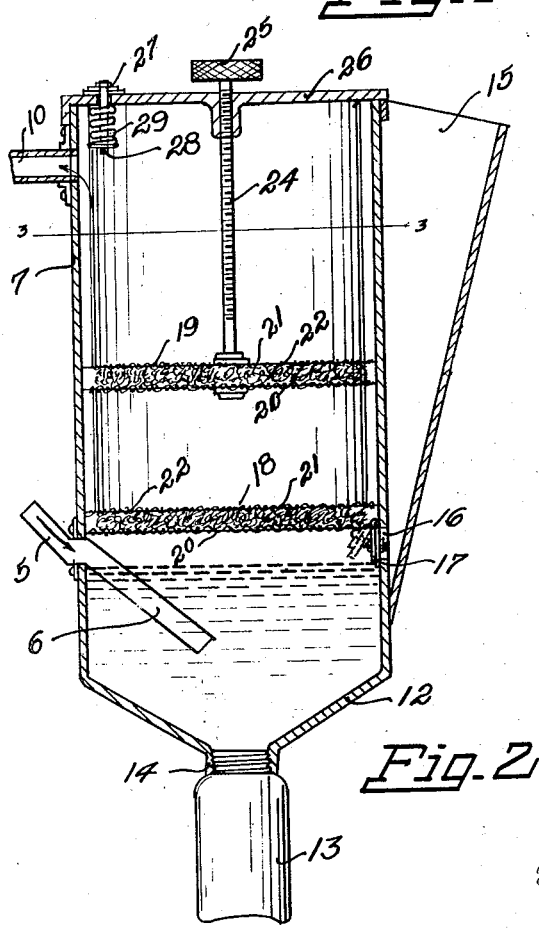
Figure 2 is an enlarged, vertical sectional view of the air purifier.
Figure 3:
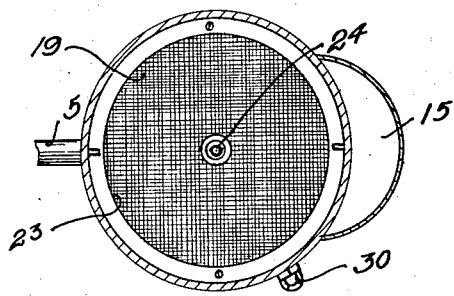
Figure 3 is a transverse sectional view at line 3—3 of Figure 2.
Figure 4:
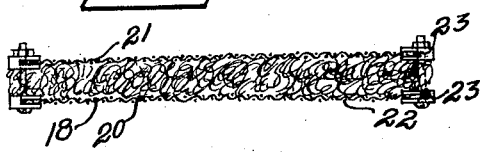
Figure 4 is an enlarged, transverse sectional view of one of the filter devices within the purifier.

In order that the invention may be readily understood I have shown in Figure 1 an engine or motor with its accessories, and designated the fan shaft at the front of the motor or engine as 1, from which extends a belt drive 2 for operating the fan blower 3. The blower directs air currents through the conductor pipe 4 which extends toward the rear of the motor and terminates in an elbow 5 with a nozzle 6. The elbow or bend 5 is located in an opening (which is of course sealed) in the wall of the cylindrical tank 7, and the nozzle 6 extends downwardly in the tank to beneath the water line as shown therein.

In Figure 1 it will be seen that the tank is attached as by brackets at 8 to the dash board or instrument board 9 of the automobile, and that the tank is connected by pipe 10 from near its upper end, with the carbureter 11. It will thus be apparent that air is forced from the fan blower, through the tank 7, in which it is purified and moistened, and thence forced into the carbureter to be mixed with the vapor therein, as fuel for the motor or engine.

Within the tank, dust and all extraneous matter is separated from the air, a tapered or conical bottom 12 being provided for directing the accummulated sediment into a receptacle 13 at the lower end of the tank. This receptacle may be of glass, and is threaded at 14 within a nipple, formed at the tapered or conical bottom of the tank. The receptacle may readily be detached when necessary for cleaning either the tank or the receptacle, and as its walls are transparent the conditions within its interior may readily be determined.

By locating the tank in the position shown it is accessible for filling, and water may be supplied thereto through the exterior filling-pocket 15, which is funnel shape and terminates near the bottom of the tank. At the lower, smaller end of the funnel-shaped pocket an opening 16 is provided in the wall of the tank providing for communication between the funnel and the interior of the tank, and this opening is normally closed by a hinged valve 17, which is suspended at the inner surface of the tank wall, and designed to hang over and close the opening 16. The valve opens inwardly for admission of water from the funnel, but is closed by pressure of air or water from the interior of the tank, to prevent waste of water.

Within the tank are two spaced filtering elements for separating dust and extraneous matters from the air, the lower one indicated as a whole by the numeral 18 and the upper one designated as a whole by the numeral 19. The tank may be of any suitable shape in cross area, but as here illustrated it is cylindrical, and therefore the filtering or washing elements are in the form of circular disks, the lower one stationary and the upper one adjustable.

These filter elements are disposed transversely in the tank and are porous for the passage therethrough of air. Each filter element comprises spaced perforate heads 20 and 21, between which is a filling of spongy or porous material 22, and upper and lower rings 23 suitably connected together form a supporting frame for each device. The filter 18 is disposed just above the water level in the lower end of the tank, and the porous material thereof is continuously moistened, while the automobile is moving, by splashing of water contained in the tank, the filter 18 also thus forming a top wall for the water chamber in the bottom of the tank.

The two filter elements are porous for the passage therethrough of air under pressure, but it will be apparent that the passage of dust and other extraneous matter is prevented and the latter are separated from the air. Moisture that is accumulated on the lower filter member is also forced therethrough with the air into the air chamber above the lower filter element, and the quantity of moisture passing out through pipe 10 with air from the tank is regulated by adjusting the position of the upper filter element. The upper filter element or disk 19 may be moved to vary the area of the space between the two disks and thus vary the density of the moistened air between the two disks. For this purpose the upper disk is provided with a screw bar 24 fixed thereto, and, passing through the tank top 26 is equipped with a thumb or hand wheel 25. By turning the hand wheel the disk 19 may be lowered to reduce the area of the space between the disks, or raised to increase the space, thus varying the density of the moisture, and securing, by regulation, the proper amount of moisture for the air passing to the carbureter.

A relief valve 27 at the exterior of the tank top 26 governs an opening in the top which permits escape of excess air pressure. The stem 28 of the valve extends into the tank, and a spring 29 normally holds the valve in closed position against escape of air, and a water gage or indicator 30 on the tank is used to indicate the water level in the tank.

The top 26 of the tank is readily removable in order that the filtering disks may be removed and cleansed, and if necessary, replaced by fresh ones, or new material be substituted for the used material.

In this manner it will be apparent that the air is washed or cleansed as it passes to the carbureter, and that the desired amount of moisture may be added to the fuel air previous to formation of the fuel charge in the carbureter, and its subsequent movement to the engine cylinder.

Having thus fully described my invention, what I claim as new and desire to secure by Letters Patent is:—

The combination of a tank having an air inlet pipe below its water level and an air outlet above said level, a moisture-absorbent filtering disk in said tank adjacent the water level and forming an air space in the upper portion of the tank, an adjustable, porous, moisture absorbent disk in said air space and below the air outlet, a closed top for the tank, and a screw bar supported in said top operatively connected with said adjustable disk.

In testimony whereof I affix my signature.

FREDRICK W. FRESE.